(12) United States Patent
Vion

(10) Patent No.: US 6,486,246 B1
(45) Date of Patent: Nov. 26, 2002

(54) POLYOLEFIN BASED HOT MELT ADHESIVE COMPOSITION

(75) Inventor: Jean Marc Vion, Louvain-la-Neuve (BE)

(73) Assignee: Montell Technology Company BV (NL)

( * ) Notice: Subject to any disclaimer, the term of this patent is extended or adjusted under 35 U.S.C. 154(b) by 0 days.

(21) Appl. No.: 09/402,381

(22) PCT Filed: Jan. 23, 1999

(86) PCT No.: PCT/EP99/00479

§ 371 (c)(1),
(2), (4) Date: Oct. 4, 1999

(87) PCT Pub. No.: WO99/40160

PCT Pub. Date: Aug. 12, 1999

(30) Foreign Application Priority Data

Feb. 3, 1998 (EP) .............................................. 98200305

(51) Int. Cl.$^7$ ..................... C08L 93/04; C08L 57/02; C08L 23/00; C09S 123/00; A47G 27/02
(52) U.S. Cl. ..................... 524/271; 524/271; 524/474; 524/499; 525/133; 525/210; 525/211; 525/240; 156/176; 156/334; 428/9
(58) Field of Search .................................. 524/271, 274, 524/499, 474; 525/133, 210, 211, 240; 156/176, 334; 428/97

(56) References Cited

U.S. PATENT DOCUMENTS 4,939,202 A * 7/1990 Maletsky et al. ........... 525/240
5,286,552 A * 2/1994 Lesca et al. ................. 525/240
5,300,365 A * 4/1994 Ogale ......................... 428/461
5,302,454 A * 4/1994 Cecchin et al. ............. 525/240
5,368,727 A * 11/1994 Lesca et al. ................. 156/176
5,409,992 A * 4/1995 Eppert, Jr. ................... 525/240
5,414,027 A * 5/1995 DeNicola, Jr. et al. ..... 525/240
5,529,845 A * 6/1996 Brenchesi et al. .......... 428/359

FOREIGN PATENT DOCUMENTS

EP 0 554 896 8/1993
EP 0 671 431 9/1995

* cited by examiner

Primary Examiner—Peter Szekely

(57) ABSTRACT

A hot melt adhesive polyolefin composition having a viscosity from 7,000 to less than 500,000 mPa·sec, at 190° C. including (by weight): I) 5–85% of a crystalline propylene polymer selected from a propylene homopolymer and a copolymer of propylene and ethylene or a $C_4$–$C_{10}$ α-olefin or blends thereof, having an isotactic index from 80 to 98%; II) 5–85% of an heterophasic polyolefin composition including: (i) a crystalline propylene polymer and (ii) and an amorphous copolymer of ethylene and propylene or a $C_4$–$C_{10}$ α-olefin or blends thereof, containing less than 40% of ethylene; III) 10–75% of a material selected from aliphatic hydrocarbon resins, terpene/phenolic resin, polyterpenes, rosin, rosin esters and blends thereof; and optionally IV) a mineral paraffinic or naphthalenic oil, an amorphous poly(α-olefin) having low molecular weight or a mixture thereof.

19 Claims, No Drawings

POLYOLEFIN BASED HOT MELT ADHESIVE COMPOSITION

BACKGROUND OF THE INVENTION

The present invention relates to a hot melt adhesive polyolefin composition. The polyolefin composition comprises both thermoplastic and elastomeric polyolefins. It also relates to articles prepared with the said adhesive composition.

The adhesive composition of the present invention can be used in several fields. It is particularly suitable for acting as a glue in tufted or needle punched carpets, the fibres of which are fixed to the primary carpet backing by the said hot melt adhesive composition. The adhesive compositions of the present invention are more particularly suitable for tufted nylon or polyester or polyolefin pile carpets wherein the primary backing is made of polyester or polyolefin.

Hot melt adhesive compositions comprising thermoplastic polyolefins are known in the art. Examples of hot melt adhesive compositions are described in published European patent application 671431 (Himont Incorporated). Said compositions are suitable for producing films and bonding the layers to each other, but are not specifically suitable for being employed as adhesives in the field of tufted or needle punched carpets.

The main drawback shown by the above hot melt composition is the too low adhesive force, in particular when they are used in non-polyolefin carpets (polyamide for instance).

In addition, although the exemplified compositions have a low viscosity, i.e. 10,000 mPa·sec, the method to obtain this viscosity is disadvantageous. The high amount of peroxides to be used makes the compositions described hardly suitable from an industrial and economical viewpoint.

It would be desirable to make it possible to have polyolefin compositions with a low viscosity but without the above-mentioned drawbacks due to the high amount of peroxides and also showing good adhesive properties.

SUMMARY OF THE INVENTION

The Applicant has now found a hot melt adhesive polyolefin composition consisting essentially of thermoplastic and elastomeric polyolefins, showing higher adhesive properties than the ones of the above-mentioned compositions.

The compositions now developed do not present the above-mentioned drawbacks and show good tuft-lock force as well as good abrasion resistance.

Another advantage of the hot melt composition of the present invention relates to their high flexibility and good dimensional stability.

An object of the present invention therefore is a hot melt adhesive polyolefin composition having viscosity from 7,000 to less than 500,000 mPa·sec, according to ASTM D 3236-73, at 190° C., preferably from 10,000 to 80,000 mPa·sec, comprising (by weight):

I. 5–85%, preferably 15–60%, most preferably 15–45%, of a crystalline propylene polymer selected from a homopolypropylene and copolymer of propylene with ethylene or a $C_4$–$C_{10}$ α-olefin or blends thereof, having a isotactic index from 80 to 98;

II. 5–85%, preferably 15–60%, most preferably 15–45%, of a heterophasic polyolefin composition comprising (i) a crystalline propylene polymer and (ii) an amorphous copolymer of ethylene with propylene or a $C_4$–$C_{10}$ α-olefin or blends thereof; said copolymer (ii) containing less than 40% of ethylene, preferably from 25 to 38%;

III. 10–75%, preferably 10–40%, of a material selected from aliphatic hydrocarbon resin, terpene/phenolic resin, polyterpenes, rosin, rosin esters and derivatives thereof and a blend thereof; and optionally IV. a mineral paraffinic or naphtalenic oil or an amorphous poly(α-olefin) having low molecular weight or a mixture thereof.

DETAILED DESCRIPTION OF THE PREFERRED EMBODIMENTS

Preferably the present composition has the above propylene polymer (I) and composition (II) in ratio from 1.3 to 0.7.

Component (I) is preferably a propylene homopolymer. In the case where component (I) is a copolymer, the comonomer content ranges preferably from 1 to 10% by weight.

Preferably component (I) has a melt flow rate (MFR), according to the method of ASTM D 1238, condition L, in the range from 250 to 2000 dg/min.

Component (II) has preferably MFR higher than 5 dg/min, more preferably from 20 to 150 dg/min, in particular from 5 to 150 dg/min.

A preferred example of heterophasic polyolefin composition (II) is as follows (percentage by weight):

(A) 5–50%, preferably 10–40%, of a crystalline propylene homopolymer with an isotactic index greater than 80%, preferably from 85 to 98%, or crystalline copolymer of propylene with ethylene or a $C_4$–$C_{10}$ α-olefin or a mixture thereof; said copolymers containing more than 85% of propylene and having an isotactic index greater than 80%;

(B) 0–20%, preferably 0–15%, of a crystalline copolymer fraction containing prevailingly ethylene, such as ethylene copolymer with propylene or a $C_4$–$C_{10}$ α-olefin or a mixture thereof;

said fraction being insoluble in xylene at ambient temperature, i.e. 25° C.; and (C) 40–95%, preferably 50–75%, of an elastomeric copolymer fraction of ethylene with propylene or with a $C_4$–$C_{10}$ α-olefin or a mixture thereof, and optionally with minor amounts of a diene; said copolymer fraction containing ethylene in an amount smaller than 40%, preferably from 20 to 38%, and being soluble in xylene at ambient temperature.

Examples of the preferred heterophasic composition are described in published European patent application EP-A-0 472946 (Himont Inc.).

As a way of example the total amount of ethylene in heterophasic composition (II) is 15 to 35% by weight.

Preferably the propylene content in the crystalline copolymers (I) as well as in the crystalline copolymers present in (II) is 90 to 99% by weight. The isotactic index is determined as the insoluble fraction in xylene at 25° C. (see note 1 below).

The amount of ethylene in fraction (B) can vary broadly. Examples of copolymer (B) have 75% by weight or more, preferably at least 80% by weight, of ethylene content with respect to the total weight of (B). For example, the copolymer is an essentially linear copolymer of ethylene with propylene, such as a linear low density polyethylene (LLDPE).

Examples of $C_4$–$C_{10}$ α-olefins that can be present in crystalline copolymers (I) as well as in heterophasic composition (II) are 1-butene, 1-pentene, 4-methyl-1-pentene, 1-hexene and 1-octene.

When present, the diene units in fraction (C) of (II) are preferably in an amount from 1% to 10% by weight with respect to the total weight of (C). Examples of dienes are butadiene, 1,4-hexadiene, 1,5-hexadiene and ethylene-1-norbornene.

The above-mentioned heterophasic composition (II) can be prepared by melt blending the polymer components such as fractions (A), (B) and (C) in the fluid state, that is at temperatures higher than their softening or melting point, or by sequential polymerisation in two or more stages in the presence of a highly stereospecific Ziegler-Natta catalyst. In particular the catalyst system used comprises (i) a solid catalyst component including a titanium compound and an electron-donor compound, both supported on magnesium chloride and (ii) an Al-trialkyl compound and an electron-donor compound.

Preferably heterophasic composition (II) has melt flow rate in the range of about 5–150 dg/min.

The desired values of MFR of components (I) and (II) within the limits defined by the present invention are obtained according to methods known in the art, for instance directly in the polymerisation process or by chemical visbreaking, i.e. a process of controlled free radical degradation of the polymer during the extrusion process, for example. Said visbreaking process is carried out, for instance, by mixing the components in the presence of radical initiators such as organic peroxides. Examples of suitable radical initiators are: dicumyl peroxide, 2,5-dimethyl-2,5-bis(butylperoxy)hexane, 2,5-dimethyl-2,5-bis(butylperoxy)hexyne-3. The process is carried out by using the proper quantities of a degrading agent as is well known in the art.

Typical component (III), also commonly called tackifier, used in the adhesive compositions of the invention is added to act as compatibilizer between the apolar polyolefin and the polar substrate (nylon for instance). Component III should be compatible with the polyolefin, i.e. should not separate upon standing in liquid or molten form, and is preferably highly oxidative stable. Among the naturally-occurring resins which may be used are aliphatic hydrocarbons, terpene/phenolic resin, polyterpenes, rosins, rosin esters and derivatives thereof, of which the more fully hydrogenated forms thereof tend to be preferred. Five and nine carbon hydrocarbon resins may be used as tackifier, for example. Various synthetically-produced tackifying resins may also be employed, examples of which include aliphatic resins, with the fully hydrogenated forms thereof again being preferred. Blends of the above mentioned tackifiers can also be used.

Practical examples of component (III) are rosin esters commercialised by Hercules with the trademark Foralyn-110. Other examples are Plastolyn HO marketed by Hercules and resins commercialised by Hercules with the trademarks Regalite R91 and Regalite R101.

The present composition can optionally include component (IV). It is added when the viscosity of the blend of mixture (I) to (III) is too high.

As said above, component (IV) can be an amorphous poly($\alpha$-olefin) having low molecular weight. When present, component (IV) is in an amount preferably from 1 to 75% by weight. Preferably the $\alpha$-olefin is selected from ethylene, propylene and 1-butene. The preferred poly($\alpha$-olefin) are ethylene/propylene copolymers and ethylene/propylene/1-butene copolymers. Particularly suitable copolymers are butene-1 rich copolymers. Comonomers bearing functional groups, for example acrylic acid, maleic acid or vinyl acetate, may also be usefully employed to increase adhesion to polar polymers.

The said poly($\alpha$-olefins) have a viscosity which is less than 10,000 mPa·sec. A specific example is the ethylene/propylene/1-butene copolymer having average weight molecular weight (Mw) of about 46,000 g/mol, melt viscosity of about 8,000 mPa·sec, marketed by Huls with the trademark Vestoplast 608.

As above-mentioned, component (IV) of the present composition can also be mineral paraffinic or naphtalenic oil. When present, it is in an amount preferably from 15 to 60% by weight.

When a blend of mineral oil and amorphous poly($\alpha$-olefin) having low molecular weight is used, any ratio of the said components is acceptable.

Additives, such as stabilisers, commonly used for olefin polymers, can be added to the polymers used to produce the adhesive composition of the present invention.

A way of preparing the adhesive composition of the present invention comprises subjecting components (I), (II) and (III) and, optionally, any further component to a blending in the molten state and an extrusion process.

The adhesive composition of the present invention can be prepared, for instance, by blending the said components all together. Alternatively a blend of components (I) and (II) is prepared in advance, subsequently the blend is blended with the other components. The above blend comprises (parts by weight):

I. 5–85 parts, preferably 15–60 parts, most preferably 15–45 parts, of a polypropylene material selected from a crystalline homopolypropylene and crystalline copolymer of propylene with ethylene or a $C_4$–$C_{10}$ $\alpha$-olefin or blends thereof, having isotactic index from 80 to 98; said polypropylene material having MFR higher than 30 dg/min, preferably 60; and II. 5–85 parts, preferably 15–60 parts, most preferably 15–45 parts, of an heterophasic polyolefin composition comprising a crystalline propylene polymer (i) and an amorphous copolymer (ii) of ethylene with propylene or a $C_4$–$C_{10}$ $\alpha$-olefin or blends thereof, containing less than 40% of ethylene, preferably from 25 to 38%; said heterophasic polyolefin composition having MFR higher than 5 dg/min, more preferably from 20 to 150 dg/min, in particular from 5 to 150 dg/min.

Another object of the present invention is a tufted or needle punched carpet wherein the fibres are glued to the primary carpet backing with the above-described adhesive composition.

The carpet fibres are made of polyamide, polyolefin (e.g., polypropylene and polyethylene) or polyester, for instance. The preferred materials are polyamide and polypropylene.

The primary backing is a woven or non-woven fabric made of polyester or polyolefin, such as polypropylene and polyethylene.

The preferred combinations of carpet backing/carpet fibre are polyester/polyamide and polypropylene/polypropylene.

The tufted or needle punched carpets of the present invention can be prepared by using the known processes. Another advantage of the hot melt compositions of the present invention is that they can be employed in the same easy way as the one described in the above-mentioned European patent application 671431 for the preparation of films.

The described process comprises the step of melting the adhesive composition and subsequently to pour it in a container having a straight slit, which can vary in both width and length, in the lower part of one of the vertical walls. The adhesive composition that comes out from said slit is cast on the carpet backing. The coated carpet is then cooled between rolls under a moderate pressure.

Examples of apparatus suitable for such a process are those of the Duplex BemaTec type, marketed by BemaTec SA.

The following examples are given to illustrate but do not limit the present invention.

The data reported in the examples and the specification relative to the following properties have been determined according to the methods indicated below.

| Property | Method |
|---|---|
| Melt Flow Rate (MFR) | ASTM D 1238, condition L |
| Isotactic Index | (see Note 1 below) |
| Solubility in xylene | (see Note 1 below) |
| Viscosity | ASTM D 3236-73 at 190° C. |
| Abrasion resistance (Lisson test) | DIN 54322 |
| Tuft-lock force | (see Note 2 below) |

Note 1

Determination of the xylene soluble fraction: a solution of the sample in xylene at a concentration of 1% by weight is prepared and kept at 135° C. for one hour while stirring. The solution is allowed to cool to 95° C., while stirring, after which it is kept for 20 minutes without stirring, and for 10 minutes under stirring. The solution is then filtered, and acetone is added to an aliquot of the filtrate to cause the polymer dissolved therein to precipitate. The polymer thus obtained is recovered, washed, dried, and weighed to determine the weight of xylene soluble fraction.

Note 2

The tuft-lock force is measured by pulling the tuft out of the carpet using a tensile tester according to method NBN G58-013.

EXAMPLES 1–4

A hot melt adhesive composition was prepared by extruding the following components:

I) 24.5 parts of a crystalline propylene homopolymer having MFR of 800 g/10 min;, II) 24.5 parts of a heterophasic composition with MFR of 100 dg/min obtained by chemical visbreaking by a suitable amount of peroxide, such as 2,5-dimethyl-2,5-di(tert-butylperoxy)hexane, of a heterophasic composition with MFR of 0.6 dg/min prepared by sequential polymerization in the presence of high yield and highly stereospecific Ziegler-Natta catalysts, supported on active magnesium chloride; the composition comprising:

A. 35 parts of a crystalline random copolymer of propylene with 3.5% ethylene; the copolymer containing about 6.5% of a soluble fraction in xylene at 25° C. and having an intrinsic viscosity [η] of 1.5 dl/g;

B. 5 parts of an essentially linear copolymer of ethylene with propylene, totally insoluble in xylene a 25° C.; and C. 60 parts of an amorphous ethylene/propylene copolymer, containing about 27% ethylene, totally soluble in xylene at 25° C. and having intrinsic viscosity [η] of 3.2 dl/g.

III) 30 parts of Foralyn 110 tackifying resin and

IV) 22 parts of mineral oil Ondina N68 commercialised by Shell

The above components were compounded in a Linden batch static mixer (Z-blade mixer). The temperature of the mixer ranged from 160° C. to 200° C. The viscosity of the composition is shown in Table 1.

The composition thus obtained was extruded in a BemaTec extruder equipped with a single Maillefer screw especially designed for hot melt processing. One single temperature per experiment was used for all the zones of the extruder barrel. This temperature was set at a value 30° C. higher than the Gear-In-Die temperature shown in Table 1. The molten composition was then pushed through the funnel container of the Duplex Coater (the Gear-In-Die-Coater) wherein the polymer composition was maintained in the molten state and from which it pulled through a thin gap on the back of the carpet (on the primary backing side).

The pile of the carpet was made from polyamide fibres (410 g/m²). The carpet primary backing was made of a polyester nonwoven of 100 g/m².

The properties of the tufted carpet are shown in Table 1.

EXAMPLE 5

Example 1 was repeated with the exception that 25 parts of propylene homopolymer (I), 25 parts of heterophasic composition (II) having MFR of 100 dg/min, 35 parts of mineral oil Ondina N68 commercialised by Shell and 15 parts of Foralyn 110 tackifying resin were used.

The viscosity of the adhesive composition and the properties of the tufted carpet are shown in Table 1.

EXAMPLE 6

Example 1 was repeated with the exceptions that the hot melt composition was directly prepared in the BemaTec extruder without a preliminary compounding in a static mixer and that the following components were used:

25 parts of propylene homopolymer (I), 25 parts of heterophasic composition (II) with MFR of 8 dg/min, 25 parts of a masterbatch of tackifying resin (60 parts) in medium MFR polypropylene commercialised by Hercules with the trademark of Plastolyn HO, 25 parts of an ethylene/propylene/1-butene copolymer with a melt viscosity of about 8,000 mPa·sec at 190° C. and an average weight molecular weight of 46,000 g/mol, commercialised by Huls with the trademark of Vestoplast 608.

The viscosity of the adhesive composition and the properties of the tufted carpet are shown in Table 1.

Comparative Example 1c

Example 6 was repeated with the exception that the following components were used:

50 parts of propylene homopolymer (I)

50 parts of heterophasic composition (II) with MFR of 8 g/10 min and 3 parts of a polypropylene masterbatch containing 10% of 2,5-dimethyl-2,5-bis(butylperoxy)hexane.

The viscosity of the adhesive compositions and the properties of the tufted carpet are shown in Table 1.

TABLE 1

| Example | GID temp. (° C.) | Coating weight (g) | Viscosity (mPa · sec) | Lisson test (g/m²) | Tuftlock force (N) | Rating |
|---|---|---|---|---|---|---|
| 1 | 240 | 414 | 25000 | 40 | 8.0 | Excellent |
| 2 | 240 | 329 | 25000 | 71 | 5.9 | Good |
| 3 | 240 | 259 | 25000 | 119 | 4.9 | Fair |
| 4 | 190 | 619 | 25000 | 41 | 6.8 | Excellent |
| 5 | 190 | 400 | 12000 | 49 | 6.9 | Excellent |
| 6 | 190 | 549 | 200000 | 128 | 5.8 | Fair |
| 1c | 240 | 450 | 32500 | >178 | 5.6 | Bad |

What is claimed is:

1. A hot melt adhesive polyolefin composition having a viscosity of from 7,000 to less than 500,000 mPa·sec at 190° C. comprising by weight:
   I. 5–85% of a crystalline propylene polymer having an isotactic index from 80 to 98% and selected from the group consisting of a propylene homopolymer, a copolymer of propylene and ethylene or a $C_4$–$C_{10}$ α-olefin and blends thereof;
   II. 5–85% of a heterophasic polyolefin composition comprising (i) a crystalline propylene polymer and (ii) an amorphous copolymer of ethylene and propylene or a $C_4$–$C_{10}$ α-olefin or blends thereof, containing less than 40% ethylene;
   III. 10–75% of a material selected from the group consisting of aliphatic hydrocarbon resins, terpene/phenolic resin, polyterpenes, rosin, rosin esters and blends thereof; and
   IV. optionally, a mineral paraffinic or naphthalenic oil or an amorphous poly(α-olefin) having a viscosity lower than 10,000 mPa·sec at 190° C., or a mixture thereof.

2. The hot melt adhesive polyolefin composition of claim 1, wherein said viscosity is from 10,000 to 80,000 mPa·sec, and comprising 15–45% of said crystalline propylene polymer, 15–45% of said heterophasic polyolefin composition, and 10–40% of said material.

3. The hot melt adhesive polyolefin composition of claim 1, further comprising from 15 to 60% of a mineral oil.

4. The hot melt adhesive polyolefin composition of claim 1, further comprising from 1 to 75% of an amorphous poly(olefin).

5. The hot melt adhesive polyolefin composition of claim 1, wherein said heterophasic polyolefin composition (ii) comprises the following fractions:
   (A) 5–50% of a crystalline propylene homopolymer with an isotactic index greater than 80%, or a crystalline copolymer of propylene and ethylene or a $C_4$–$C_{10}$ α-olefin or a mixture thereof; said copolymer containing more than 85% of propylene and having an isotactic index greater than 80%;
   (B) 0–20% of a crystalline copolymer containing prevailingly ethylene; said copolymer being insoluble in xylene at ambient temperature; and
   (C) 40–95% of an elastomeric copolymer of ethylene and propylene or a $C_4$–$C_{10}$ α-olefin or a mixture thereof, said elastomeric copolymer containing ethylene in an amount less than 40%, being soluble in xylene at ambient temperature, and optionally containing a diene.

6. The hot melt adhesive polyolefin composition of claim 5, comprising 10–40% of (A), 0–15% of (B), and 50–75% of (C).

7. The hot melt adhesive polyolefin composition of claim 1, wherein propylene polymer (I) and composition (II) are present in a ratio from 1.3 to 0.7.

8. An article comprising the hot melt adhesive composition of claim 1.

9. An article comprising the hot melt adhesive composition of claim 2.

10. An article comprising the hot melt adhesive composition of claim 3.

11. An article comprising the hot melt adhesive composition of claim 4.

12. An article comprising the hot melt adhesive composition of claim 5.

13. A tufted or needle punched carpet containing the hot melt adhesive composition of claim 1.

14. A tufted or needle punched carpet containing the hot melt adhesive composition of claim 2.

15. A tufted or needle punched carpet containing the hot melt adhesive composition of claim 3.

16. A tufted or needle punched carpet containing the hot melt adhesive composition of claim 4.

17. A tufted or needle punched carpet containing the hot melt adhesive composition of claim 5.

18. The carpet of claim 13, wherein said carpet has a woven or non-woven primary backing.

19. A process for preparing the carpet of claim 13, comprising the steps of:
   (i) melting said adhesive composition;
   (ii) casting said adhesive composition onto a carpet backing of said carpet; and
   (iii) cooling the coated carpet between rolls under pressure.

* * * * *